3,314,926
VULCANIZATION
Gerard Kraus and Kent W. Rollmann, Bartlesville, Okla., assignors to Phillips Petroleum Company, a corporation of Delaware
No Drawing. Filed July 12, 1963, Ser. No. 294,759
15 Claims. (Cl. 260—79.5)

This invention relates to an improved method for the vulcanization of synthetic rubber compositions. In one aspect, this invention relates to a method for improving the curing of synthetic rubber compositions. In another aspect, this invention relates to a method for increasing the scorch time in the vulcanization of synthetic rubber compositions by incorporation therein of novel accelerator adjuvants.

The vulcanization of natural and synthetic rubbers by the addition of sulfur or sulfur donor compounds is well known. It is also known that the addition of small amounts of materials known as accelerators may substantially reduce the time required for vulcanization. However, with the use of many of the known accelerators, difficulty has been experienced in achieving complete blending of the recipe prior to the occurrence of scorch. Therefore, it would be highly desirable in the art to provide a means for preventing this premature vulcanization, or scorching, during the normal mixing and processing of polymer compositions.

Thus, an object of this invention is to provide a method for achieving delayed-action cure of vulcanizable elastomers.

Another object of this invention is to provide a method for obtaining delayed-action cure with accompanying increased scorch time for vulcanizable elastomers.

Other aspects, objects and the several advantages of the present invention will be apparent from the following disclosure and the appended claims.

In accordance with the present invention, we have now discovered that delayed-action cure and increased scorch time are obtained by the use of substituted or unsubstituted pyridines, quinolines or isoquinolines as accelerator adjuvants in the sulfur vulcanization of synthetic vulcanizable elastomers and particularly high cis-polybutadiene.

This invention can be employed advantageously in the vulcanization by sulfur of a vulcanizable elastomer, either natural or synthetic. Ordinarily, synthetic elastomers include homopolymers of conjugated dienes having from 4 to 8 carbons atoms per molecule, copolymers of mixtures of said conjugated dienes, and copolymers having a major amount of conjugated diene and a minor amount of a copolymerizable monomer containing a

group.

Examples of said synthetic elastomers are polybutadiene, polyisoprene, butadiene-styrene copolymers, butadiene-methylvinylpyridine copolymers, butadiene-acrylonitrile copolymers, polychloroprene and various other vulcanizable solid or semi-solid conjugated diene polymers and copolymers. The preferred starting material for synthetic polymers employed in this invention is a polymer of 1,3-butadiene or isoprene. Particularly preferred are the polymers having a high proportion of cis-1,4 configuration which have recently been produced by a number of methods such as those described in the copending applications of David R. Smith and Robert P. Zelinski, Ser. No. 578,166, filed Apr. 16, 1956; Floyd E. Naylor and John R. Hooten, Ser. No. 754,175, filed Aug. 11, 1958; and Robert P. Zelinski, Ser. No. 844,651, filed Oct. 6, 1959. For further details, reference is hereby made to these copending applications. The preferred cis-1,4-polybutadiene contains at least 75 percent and up to 100 percent, preferably 85 to 98 percent or higher, of the polymer units formed by cis-1,4-addition of the butadiene, the remainder of the polymer being formed by trans-1,4- and 1,2-addition of the butadiene. The preferred cis-polyisoprene is one in which at least 75 percent and up to 100 percent, preferably 85 to 95 percent or higher, of the polymer units is formed by cis-1,4-addition of the isoprene, the remainder of the polymer being formed by trans-1,4-, 3,4- and 1,2-addition of the isoprene.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer of from 1 to 4, inclusive. The aliphatic and cycloaliphatic radicals can be saturated or contain olefinic unsaturation. The R in the formula has a valence equal to the integer and preferably contains from 1 to 20, inclusive, carbon atoms, although it is within the scope of the invention to use higher molecular weight compounds. Examples of these compounds include methyllithium, isopropyllithium, n-butyllithium, tert-octayllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4,-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML–4 at 212° F.), the quantity of initiator required generally will be in the range of 2 to 2.4 millimols per 100 parts of total monomers charged.

The compounding of natural and synthetic rubber frequently involves the addition of a large and varied group of materials, each of which performs a particular function, either singly or in combination with the remaining compounding ingredients. Any of the standard sulfur-type compounding recipes used for synthetic or natural rubber are applicable for this invention.

By conventional practice, the rate of cure of vulcanizable elastomers, either synthetic or natural, in the presence of sulfur and/or a sulfur donor is increased by the addition of accelerators commonly divided into four classes: (1) basic type accelerators, such as guanidines, aldehyde-amines, and the like; (2) acidic type accelerators and their derivatives, such as thiazoles, thiazolines and their derivatives; (3) thiuram sulfides; and (4) dithiocarbamates, such as zinc diethyldithiocarbamate. However, many of these accelerators suffer from the fact that scorching, the incipient vulcanization which occurs during any of the processing steps preceding the final vulcanization or during storage between processing steps, can occur.

To avoid these adverse conditions, accelerator adjuvants are provided in accordance with the present invention which aid in overcoming the disadvantages experienced with previously known accelerators when employed alone. By utilizing the accelerator adjuvants of this invention, there is achieved a delayed-action cure which allows for adequate handling and treating of the rubber prior to its being cured.

Compounds useful as accelerator adjuvants according to this invention are selected from the group consisting of heterocyclic nitrogen-containing compounds having the structural formulas selected from:

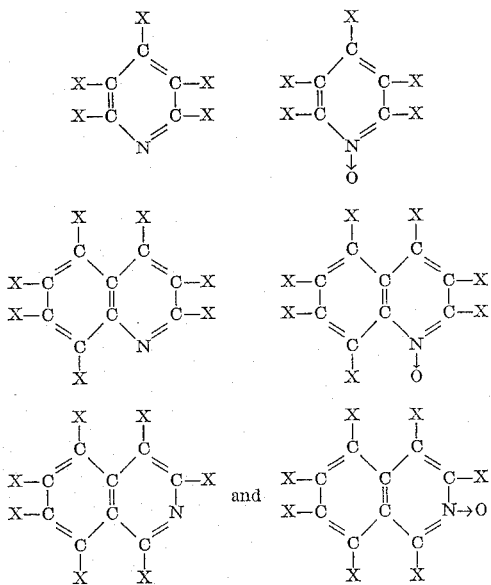

wherein X is selected from the group consisting of hydrogen, chlorine, bromine, alkyl and alkoxy radicals containing from 1 to 4 carbon atoms, aralkoxy radicals containing from 7 to 10 carbon atoms, the amino radical, and the nitro radical.

Representative and specific heterocyclic nitrogen-containing compounds of the above-described general structural formulas which can be employed according to the practice of the present invention are:

Pyridine
3-aminopyridine
4-aminopyridine
Pyridine-N-oxide
Quinoline
Quinoline-N-oxide
4-nitroquoinoline-N-oxide
4-methoxy-pyridine-N-oxide
4-methoxy-pyridine
4-nitro-2-methyl-5-ethylpyridine-N-oxide
4-nitro-2-methyl-5-ethylpyridine
4-amino-2-n-butyl-5-ethylpyridine
2,3-diethoxyquinoline-N-oxide
2,3-diethoxyquinoline
4-chloropyridine
4-chloropyridine-N-oxide
3-bromo-5-nitropyridine-N-oxide
2,3-dimethyl-4-chloroquinoline-N-oxide
2,3,4,5-tetrachloro-6-n-butyl pyridine
2,3,4,5-tetrachloro-6-n-butyl pyridine-N-oxide
2-n-butyl-4-bromo-7-n-butoxyquinoline
2-n-butyl-4-bromo-7-n-butoxyquinoline-N-oxide
2-chloro-3-n-propoxy-4,5-diethylpyridine-N-oxide
2-chloro-3-n-propoxy-4,5-diethylpyridine
2-methyl-5-ethyl-6-nitropyridine
2-methyl-5-ethyl-6-nitropyridine-N-oxide
5,6,7,8-tetraethyl-2,4-dinitroquinoline-N-oxide
5,6,7,8-tetraethyl-2,4-dinitroquinoline
2-bromo-3-ethoxy-4-methyl-5-nitropyridine-N-oxide
2-bromo-3-ethoxy-4-methyl-5-nitropyridine
4-benzyloxypyridine
4-benzyloxypyridine-N-oxide
3-(2-phenylethoxy)quinoline-N-oxide
3-(2-phenylethoxy)quinoline
3-(4-phenyl-n-butoxy)-5-aminoquinoline
4-(3-phenyl-n-butoxy)pyridine-N-oxide
4-(3-phenyl-n-butoxy)pyridine
4-nitropyridine-N-oxide
4-nitropyridine
4-nitro-3-methylpyridine-N-oxide
4-nitro-3-methylpyridine
4-nitro-2-methylpyridine-N-oxide
4-nitro-2-methylpyridine
2,4-dinitropyridine-N-oxide
2,4-dinitropyridine
2-nitropyridine-N-oxide
2-nitropyridine
Isoquinoline-N-oxide
Isoquinoline
3-chloro-isoquinoline-N-oxide
3-chloro-isoquinoline
4-bromo-7-nitro-isoquinoline
4-bromo-7-ethoxy-isoquinoline-N-oxide
5-nitro-isoquinoline-N-oxide
3,4-diethyl-5-propoxy-7-amino-isoquinoline
5-nitro-isoquinoline
3,4-dimethyl-5-ethoxyisoquinoline-N-oxide
3,4-dimethyl-5-ethoxyisoquinoline
and the like.

The sulfur-containing curative system to be used can be any of those known in the art but preferably using about 0.5 to 5.0 phr. (parts per hundred of rubber) of elemental sulfur and about 0.1 to 5.0, preferably 0.3 to 2.0, phr. of conventional primary accelerators and about 0.1 to 5.0, preferably 0.3 to 2.0, phr. of an accelerator adjuvant.

Specific primary accelerators which are suitable for use with the accelerator adjuvants of the present invention include the following:

| | |
|---|---|
| NOBS Special | N-oxydiethylene-2-benzothiazyl sulfenamide. |
| Altax | 2,2'-dibenzothiazyl disulfide. |
| Santocure | N-cyclohexy-2-benzothiazole sulfenamide. |
| Selenac | Selenium diethyldithiocarbamate. |
| Captax | 2-mercaptobenzothiazole. |
| Tetrone | Dipentamethylenethiuramtetrasulfide. |
| Cumate | Cupric dimethyldithiocarbamate. |
| Tellurac | Tellurium diethyldithiocarbamate. | and the like.

The vulcanization accelerators in accordance with the invention are mixed with other known vulcanization accelerators.

By delayed-action cure is meant the extending of the time lapse after mixing and before cure of the polymer occurs. Cure is measured as described in Rubber World 135, 67–73, 254–60 (1956). As described in that article, cure is a measure of the amount of cross-linking that has occurred and is reported as mols per cc.

By scorch time is meant the period of time required for a 5-point rise above the minimum Monney viscosity as determined by ASTM D 1646–61 using a Mooney viscometer and a large rotor at a temperature of 280° F.

Fillers such as carbon black, silica, alumina, magnesia, titania, calcium silicate, calcium carbonate, zinc oxide, zinc sulfide and the like can be used in conjunction with the accelerators of the present invention.

By utilization of the accelerator adjuvants of the present invention in conjunction with the known conventional accelerators, there is provided among other advantages, as will be illustrated by the examples, a delayed curing action which affords greater processing safety.

Cure rates with the various accelerator combinations are:

| Run No. | Accelerator | | NPO, Phr. | $\nu \times 10^4$, mols/cc.[1] | | |
|---|---|---|---|---|---|---|
| | Compound | Phr. | | Cure time at 307° F., min. | | |
| | | | | 20 | 30 | 45 |
| 1 | None | 0.0 | 1.0 | (2) | (2) | (2) |
| 2 | Santocure | 1.0 | 0.0 | 1.58 | 1.89 | 1.95 |
| 3 | ---do--- | 0.5 | 0.0 | --------- | 0.61 | 0.80 |
| 4 | ---do--- | 0.5 | 0.5 | 0.47 | 1.29 | 1.94 |
| 5 | NOBS Special | 1.0 | 0.0 | 1.80 | 1.92 | 1.99 |
| 6 | ---do--- | 0.5 | 0.0 | 0.33 | 0.64 | 0.84 |
| 7 | ---do--- | 0.5 | 0.5 | 0.47 | 1.21 | 1.91 |

[1] Rubber World 135, 67–73, 254–260 (1956).
[2] No cure.

The following examples further illustrate the invention without in any way limiting it thereto.

EXAMPLE I

Cis-polybutadiene stocks prepared according to the process of the aforementioned copending Zelinski application, Ser. No. 844,651, were compounded in the following recipe:

| | Parts by weight |
|---|---|
| Polymer | 100. |
| Philblack O [1] | 50. |
| Philrich 5 [2] | 5. |
| Resin 731 [3] | 5. |
| Zinc oxide | 3. |
| Stearic acid | 1. |
| Flexamine [4] | 1. |
| Sulfur | 1.75. |
| Accelerator | Variable. |
| Accelerator adjuvant | 4-nitropyridine-N-oxide (NPO). |

[1] A high-abrasion furnace black.
[2] A highly aromatic oil.
[3] A disproportionated pale rosin stable to heat and light.
[4] A physical mixture of a complex diarylamine-ketone reaction product (65%) and N,N'-diphenyl-p-phenylenediamine (35%).

The above data indicate that the beneficial effects of delayed-action cure are obtained by substituting 0.5 phr. of an accelerator adjuvant of the invention for 0.5 phr. of a conventional primary accelerator. A desirable cure level is represented by a $\nu$ value of about 2. When the accelerator adjuvant is employed there is achieved a slower approach to the desired cure level ($\nu$—a measure of cross-linking obtained) than where the accelerator alone is used. Thus a less sudden approach to the cure state or a delay cure effect is achieved.

EXAMPLE II

Cis-polybutadiene stocks prepared in the same manner as that used in Example I were compounded in the following recipe on a 2-inch roll mill and cured at different times at 307° F.:

| | Parts by weight |
|---|---|
| Polymer | 100. |
| Philblack O | 50. |
| Philrich 5 | 10. |
| Zinc oxide | 3. |
| Stearic acid | 2. |
| Flexamine | 1. |
| Sulfur | 1.75. |
| Accelerator | Variable. |
| Accelerator adjuvant | Variable. |

| Run No. | Accelerator | | Accelerator Adjuvant | | $\nu \times 10^4$, mols/cc. | | | Scorch at 280° F., minutes |
|---|---|---|---|---|---|---|---|---|
| | Compound | Phr. | Compound | Phr. | Minutes at 307° F. | | | |
| | | | | | 20 | 30 | 45 | |
| 1 | Santocure | 1.0 | None | ------ | 1.72 | 1.75 | 1.79 | 12.0 |
| 2 | ---do--- | 0.5 | 4-Nitro-3-methyl-pyridine-N-oxide | 0.5 | 0.62 | 1.20 | 1.71 | 25.3 |
| 3 | ---do--- | 0.5 | Pyridine-N-oxide | 0.5 | 1.51 | ------ | 1.72 | 15.1 |
| 4 | ---do--- | 0.6 | 4-Nitro-2-methyl-pyridine-N-oxide | 0.5 | 1.13 | 1.73 | 2.00 | 25.7 |
| 5 | ---do--- | 0.6 | 4-Nitroquinoline-N-oxide | 0.5 | 0.41 | 1.48 | 1.79 | 37.4 |
| 6 | ---do--- | 0.6 | 4-Aminopyridine | 0.5 | 0.87 | 2.11 | 2.09 | 12.6 |
| 7 | NOBS Special | 1.0 | None | ------ | 1.74 | 1.83 | 1.85 | 14.6 |
| 8 | ---do--- | 0.5 | 4-Nitro-3-methyl-pyridine-N-oxide | 0.5 | 0.96 | 1.48 | 1.82 | 24.3 |
| 9 | ---do--- | 0.5 | Pyridine-N-oxide | 0.5 | 1.07 | 1.80 | 1.80 | 15.9 |

The above data indicate that delayed-action cure is effected by the compounds of the invention and that the scorch time is increased.

EXAMPLE III

*Cis*-polybutadiene stocks prepared in the same manner as those used in Example I were compounded in the following recipes, with the indicated properties after curing 40 minutes at 307° F.:

|  | Sample Number | |
|---|---|---|
|  | A | B |
|  | Parts by Weight | |
| Polymer | 100 | 100 |
| Zinc oxide | 3 | 3 |
| Stearic acid | 2 | 2 |
| Resin 731 | 3 | 3 |
| Flexamine | 1 | 1 |
| Sulfur | 1 | 1 |
| Santocure | 0.6 | 0.3 |
| NPO | 0 | 0.3 |
| Vulcanization properties: |  |  |
| Scorch at 280° F., min | 33.2 | 38.8 |
| $\nu$ at $10^4$, mols/cc | Undercured | 0.40 |

The above data show that substitution of 0.3 part of accelerator adjuvant for 0.3 part of primary accelerator results in improvement both in cure and in scorch properties.

EXAMPLE IV

Butadiene was polymerized using the following recipe:

```
                                    Parts by weight
1,3-butadiene  _____ 100
Cyclohexane    _____ 780
n-Butyllithium _____ 0.067
```

Cyclohexane was charged to the reactor, which was then purged with nitrogen. Butadiene and a cyclohexane solution of n-butyllithium were then charged in that order. The reactor was then tumbled in a constant temperature bath at 50° C. for 5.5 hours. At that time the reaction was terminated and the polymer coagulated with sufficient isopropyl alcohol containing 10 weight percent antioxidant (2,2'-methylene-bis-(4-methyl-6-*tert*-butylphenol)) to give one part by weight of antioxidant per 100 parts of polymer. The polymer was then water washed and dried.

Portions of this polybutadiene were compounded in the following recipes with the indicated properties after curing 40 minutes at 307° F.:

|  | Sample Number | | | |
|---|---|---|---|---|
|  | C | D | E | F |
|  | Parts by Weight | | | |
| Polymer | 100 | 100 | 100 | 100 |
| Alon C | 40 | 40 | 0 | 0 |
| Philblack O | 0 | 0 | 50 | 50 |
| Philrich 5 | 0 | 0 | 5 | 5 |
| Zinc oxide | 3 | 3 | 3 | 3 |
| Stearic acid | 2 | 2 | 2 | 2 |
| Flexamine | 1 | 1 | 1 | 1 |
| Sulfur | 1.2 | 1.2 | 1.7 | 1.7 |
| Santocure | 1 | 0.5 | 1 | 0.5 |
| NPO | 0 | 0.5 | 0 | 0.5 |
| Vulcanization Properties: |  |  |  |  |
| Scorch at 280° F., min | 5.5 | 5.9 | 10.3 | 11.8 |
| $\nu$ at $10^4$, mols/cc | 0.80 | 0.99 | 2.06 | 2.22 |

For the stocks with either alumina or carbon black filler, the data show that substitution of 0.5 part of accelerator adjuvant for 0.5 part of primary accelerator results in better cure and improved scorch properties.

While certain embodiments of the invention have been described for illustrative purposes, the invention is not limited thereto. Various modifications will be apparent to those skilled in the art in view of the disclosure, such modifications being within the spirit and scope of the invention.

We claim:

1. A process for improving the cure of a sulfur-vulcanizable elastomer selected from the group consisting of homopolymers and copolymers of conjugated dienes having from 4 to 8 carbon atoms and mixtures thereof and copolymers having a major amount of conjugated diene and a minor amount of a copolymerizable monomer containing a

group which comprises intimately admixing with said elastomer at least one vulcanizing agent selected from the group consisting of elemental sulfur and a sulfur donor and an accelerator composition comprising a primary accelerator and an accelerator adjuvant to achieve delayed cure selected from the group consisting of substituted and unsubstituted pyridine, pyridine-N-oxide, quinoline, quinoline-N-oxide, isoquinoline and isoquinoline-N-oxide.

2. A process according to claim 1 wherein said accelerator adjuvant is selected from heterocyclic nitrogen-containing compounds having a structural formula selected from

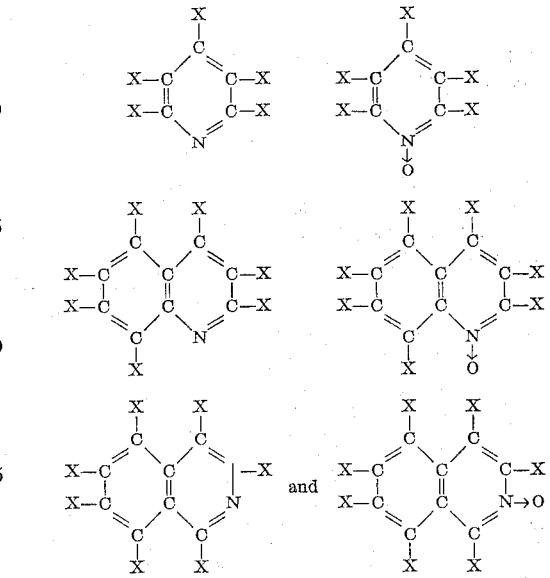

wherein X is selected from the group consisting of hydrogen, chlorine, bromine, alkyl and alkoxy radicals containing from 1 to 4 carbon atoms, aralkoxy radicals containing from 7 to 10 carbon atoms, the amino radical, and the nitro radical.

3. In a process for vulcanizing sulfur-vulcanizable elastomers selected from the group consisting of homopolymers and copolymers of conjugated dienes having from 4 to 8 carbon atoms and mixtures thereof and copolymers having a major amount of conjugated diene and a minor amount of a copolymerizable monomer containing a

group by incorporating therein sulfur or a sulfur donor as a vulcanization accelerator, the improvement which comprises incorporating therein about 0.3 to 2.0 part per hundred elastomer of an accelerator composition comprising one or more primary accelerators and about 0.3 to 2.0 part per hundred elastomer of an accelerator adjuvant to achieve delayed cure selected from the group consisting of substituted and unsubstituted pyridine, pyridine-N-oxide, quinoline, quinoline-N-oxide, isoquinoline and isoquinoline-N-oxide.

4. A process according to claim 3 wherein the accelerator adjuvant is selected from heterocyclic nitrogen-containing compounds having a structural formula selected from

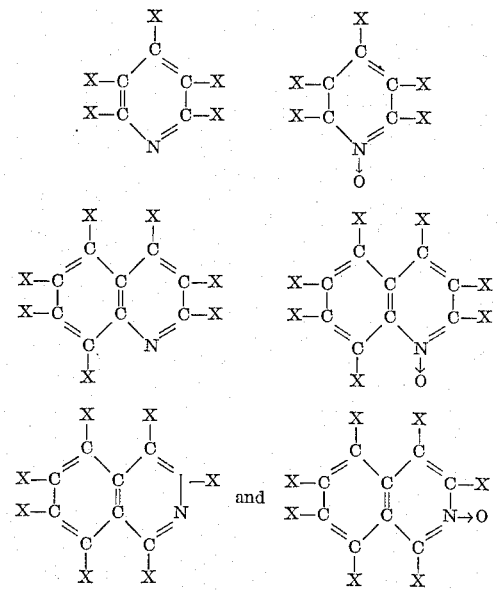

wherein X is selected from the group consisting of hydrogen, chlorine, bromine, alkyl and alkoxy radicals containing from 1 to 4 carbon atoms, aralkoxy radicals containing from 7 to 10 carbon atoms, the amino radical and the nitro radical.

5. A process for providing a delayed cure in the vulcanization of cis-polybutadiene with one or more vulcanizing agents selected from the group consisting of sulfur and a sulfur donor compound as a primary accelerator which comprises adding to the composition prior to vulcanizing same an accelerator adjuvant to achieve delayed cure selected from the group consisting of substituted and unsubstituted pyridine, pyridine-N-oxide, quinoline, quinoline-N-oxide, isoquinoline and isoquinoline-N-oxide.

6. A process according to claim 5 wherein the accelerator adjuvant is selected from heterocyclic nitrogen-containing compounds having a structural formula selected from

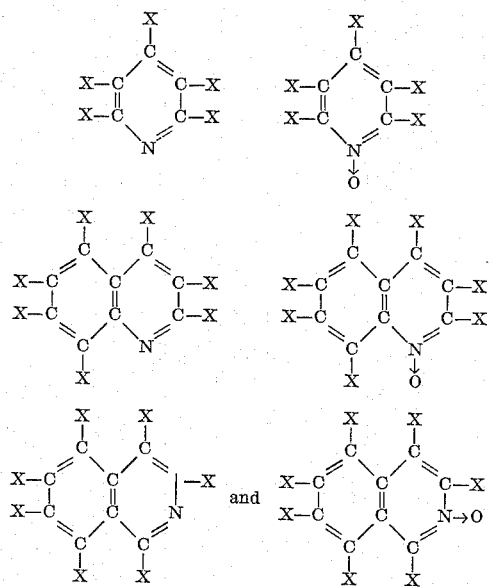

wherein X is selected from the group consisting of hydrogen, chlorine, bromine, alkyl and alkoxy radicals containing from 1 to 4 carbon atoms, aralkoxy radicals containing from 7 to 10 carbon atoms, the amino radical and the nitro radical.

7. The process of claim 5 wherein said accelerator adjuvant is pyridine-N-oxide.

8. The process of claim 5 wherein said accelerator adjuvant is 4-nitropyridine-N-oxide.

9. The process of claim 5 wherein said accelerator adjuvant is 4-nitro-3-methylpyridine-N-oxide.

10. The process of claim 5 wherein said accelerator adjuvant is 4-nitro-2-methylpyridine-N-oxide.

11. The process of claim 5 wherein said accelerator adjuvant is 4-nitroquinoline-N-oxide.

12. The process of claim 5 wherein said accelerator adjuvant is 4-aminopyridine.

13. A process for providing a delayed cure in the vulcanization of butyllithium polymerized elastomer selected from the group consisting of homopolymers and copolymers of conjugated dienes having from 4 to 8 carbon atoms and mixtures thereof and copolymers having a major amount of conjugated diene and a minor amount of a copolymerizable monomer containing a

group with one or more vulcanizing agents selected from the group consisting of sulfur and sulfur donor compounds as accelerators which comprises adding to the composition prior to vulcanizing same an accelerator adjuvant to achieve delayed cure selected from the group consisting of substituted and unsubstituted pyridine, pyridine-N-oxide, quinoline, quinoline-N-oxide, isoquinoline and isoquinoline-N-oxide.

14. The process of claim 13 wherein the accelerator adjuvant is selected from heterocyclic nitrogen-containing compounds having a structural formula selected from

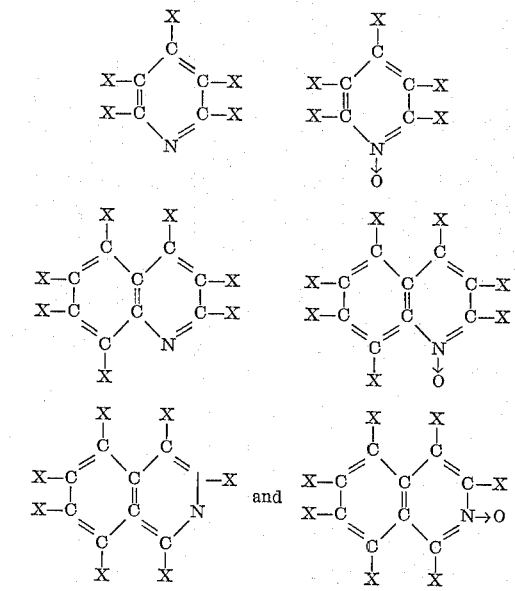

wherein X is selected from the group consisting of hydrogen, chlorine, bromine, alkyl and alkoxy radicals containing from 1 to 4 carbon atoms, aralkoxy radicals containing from 7 to 10 carbon atoms, the amino radical and the nitro radical.

15. The process of claim 13 wherein said accelerator adjuvant is 4-nitropyridine-N-oxide.

References Cited by the Examiner

UNITED STATES PATENTS

| | | | |
|---|---|---|---|
| 2,747,005 | 5/1956 | Zerbe et al. | 260—79.5 |
| 3,026,305 | 3/1962 | Robinson | 260—79.5 |
| 3,036,980 | 5/1962 | Dunham et al. | 260—79.5 X |

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,314,926　　　　　　　　　　　　April 18, 1967

Gerard Kraus et al.

It is hereby certified that error appears in the above numbered patent requiring correction and that the said Letters Patent should read as corrected below.

Column 8, lines 68 and 69, for "0.3 to 2.0" read -- 0.1 to 5.0 --; column 9, lines 3 to 7, the right-hand formula should appear as shown below instead of as in the patent:

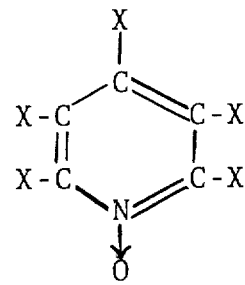

column 10, lines 42 to 50, the right-hand formula should appear as shown below instead of as in the patent:

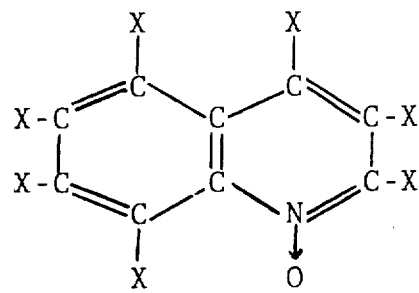

same column 10, lines 50 to 59, the left-hand formula should appear as shown below instead of as in the patent:

3,314,926
(2)

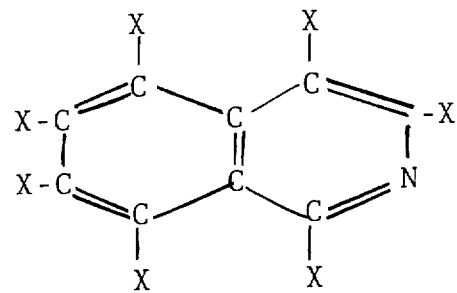

Signed and sealed this 9th day of January 1968.

(SEAL)
Attest:

EDWARD M. FLETCHER, JR.
Attesting Officer

EDWARD J. BRENNER
Commissioner of Patents